Oct. 28, 1941.          S. C. BRODY            2,261,015
                        SOLDERING IRON
                     Filed April 10, 1939

INVENTOR.
Samuel C. Brody
BY Spear, Rawlings & Spear
ATTORNEYS.

Patented Oct. 28, 1941

2,261,015

UNITED STATES PATENT OFFICE 2,261,015

SOLDERING IRON

Samuel C. Brody, Brighton, Mass.

Application April 10, 1939, Serial No. 267,152

3 Claims. (Cl. 219—26)

This invention relates to soldering irons, and particularly to the tips or points thereof.

For the purposes of this application, I shall describe and illustrate my invention as applied to a soldering iron of the type wherein the tip or point is heated by a blast flame caused by the combustion of expanding fuel vapor and oxygen. It will be understood, however, that such treatment is purely illustrative and in no way limiting, and that the principles of my invention may be embodied in soldering irons which are otherwise heated, as, for example, by electricity.

One important object of my invention is to provide a soldering iron of such design and construction that the tip or point will be heated to the maximum intensity in the minimum time and with the minimum expenditure of fuel or electrical current.

Heretofore it has not been possible to obtain the maximum heat at the soldering tip or point, due to the fact that such tip or point was made practically solid. I overcome this disadvantage in my soldering iron by providing the tip or point with a hollow portion which extends substantially to the outer end of the tip or point and thus compels practically all the heat units to travel to said outer end without appreciable loss or dissipation.

Another important object of my invention is to provide for the quick and easy assembly of any of a wide variety of my novel tips, points or shapes of different sizes and designs to the soldering iron.

A further important object of my invention is to make possible the adjustment and locking of the various interchangeable tips, points, or shapes at any desired angular position with reference to the soldering iron itself.

These, and other objects, which will appear more fully hereinafter, are secured in the device of the present invention.

In the accompanying specification and drawing, I have described and illustrated embodiments of my invention which I have found highly satisfactory in actual service and well adapted to the requirements of commercial manufacture.

Figure 1:
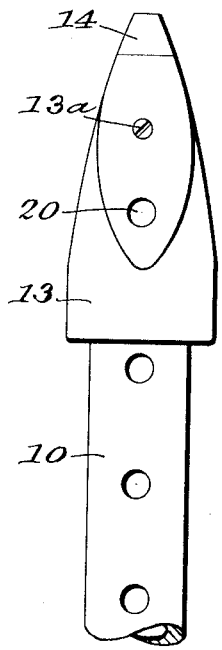
Fig. 1 is a fragmentary elevation of a soldering iron of the fluid-heated type embodying one form of my invention wherein the soldering tip or point is an inserted element detachably mounted at the outer end of a hollow holder assembled on the burner tube.
Figure 2:
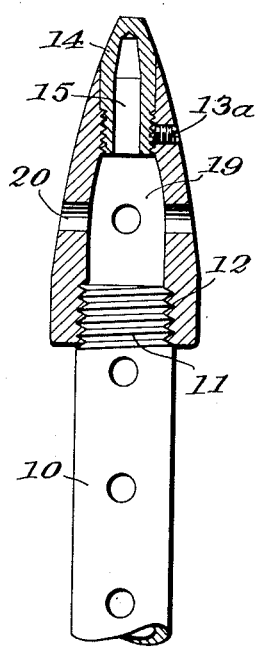
Fig. 2 is a longitudinal section of Fig. 1.
Figure 3:
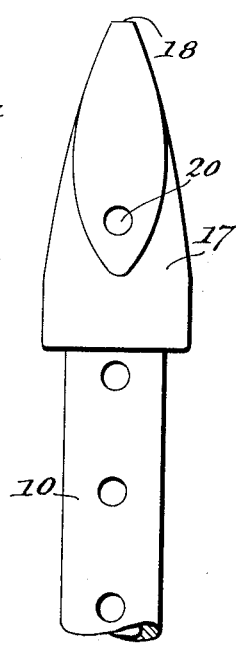
Fig. 3 is a view similar to Fig. 1, but showing another form of my invention wherein the soldering tip or point is constructed as a hollow member assembled on the burner tube, the outer end of such member constituting the actual tip or point for applying the solder.
Figure 4:
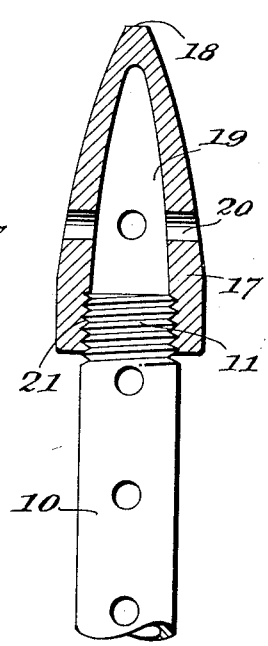
Fig. 4 is a longitudinal section of Fig. 3.
Figure 5:
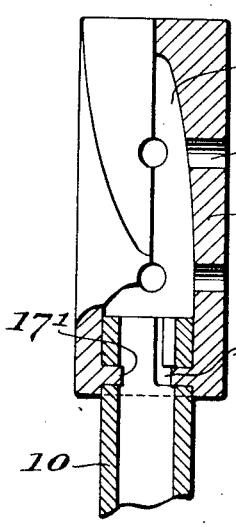
Fig. 5 is a part-section, part-elevation, of a soldering point or tip similar to that shown in Figs. 3 and 4 but of different design, and also showing an alternative form of quick-detachable connection between the tip or point and the burner tube.
Figure 6:
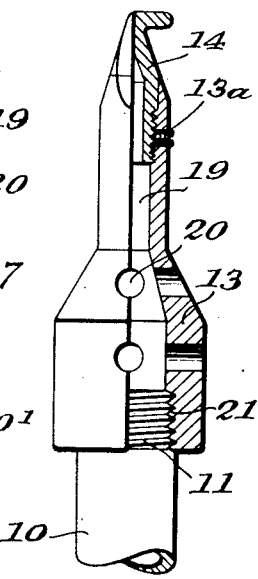
Figures 7, 8:
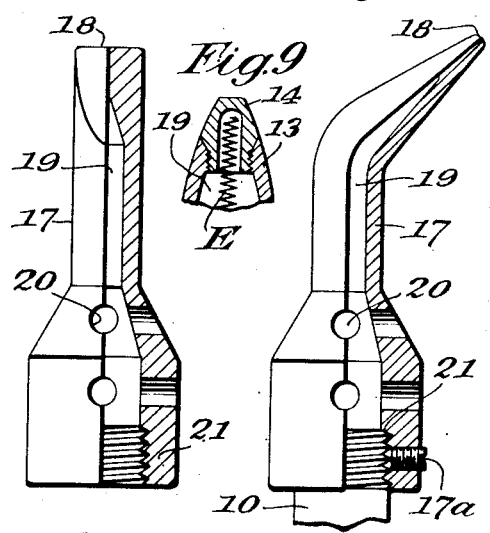

Fig. 6 is a similar view showing a tip or point like that shown in Figs. 1 and 2, but of different design, and Figs. 7 and 8 are similar views of tips or points like those shown in Figs. 3, 4 and 5 but showing still different designs, and Fig. 9 shows a further modification.

My soldering iron is characterized by its extreme simplicity of design, low manufacturing cost, and unusually high efficiency and reliability in operation.

I have indicated at 10 in Figs. 1 to 6 inclusive the usual perforate burner tube of a soldering iron of the type which is heated by expanded vapors or gases continuously supplied thereto while the iron is operating from any suitable combustion unit.

Unlike other soldering irons of this general type now on the market, however, the design is such that the blast flame heat from the burner tube 10 is directed against the soldering tip or point interiorly thereof as a concentrated flame of the maximum intensity. This insures that the tip or point will be instantly heated in the minimum time, with the minimum expenditure of fuel, and without substantial heat losses.

I achieve these advantages by interposing between the outer end of the burner tube 10 and the actual soldering tip or point a hollow member.

In one embodiment of my invention (Figs. 1, 2, 6 and 9) this hollow member is a holder for the actual soldering tip or point which preferably is detachably assembled to the outer end of said member.

In another embodiment of my invention (Figs. 3, 4, 5, 7 and 8) this holder member itself is the solder-applying element, the outer end of said member constituting an integral tip or point.

In all forms except Fig. 9, the blast flame heat from the burner tube 10 passes through the hollow member and impinges directly upon the soldering tip or point as a concentrated flame of maximum intensity. Additionally, the wall of the hollow member acts as a continuous conductor of heat to the actual soldering tip or point when the device is operating.

The combined effect of the directly-applied flame and the constantly conducted heat along the hollow member is to bring the soldering tip or point to the maximum degree of heat in the minimum time.

In all forms of my invention except the form shown in Fig. 5, the outer end of the burner tube 10 is provided with a relatively short series of external screw threads 11 for cooperation with a similar series of internal screw threads 12 or 21 at the inner end of a hollow body member 13 or 17 which is detachably mounted on said burner tube in axial prolongation thereof.

In Fig. 5, a different form of quick-detachable connection between the burner tube 10 and hollow member is provided. In that figure, the burner tube is shown as having one or more bayonet slots 10' cut through its wall and the hollow member as having one or more internal lugs or projections 17' for coaction with said slots to thereby firmly but detachably assemble the hollow member on the burner tube.

In Figs. 1, 2, 6 and 9, the hollow member is open from end to end and constitutes a holder or mount 13 for a detachable soldering tip or point 14 at the outer end of said member. The tip or point 14 is hollow from its inner end substantially to its outer end, as illustrated at 15. This tip or point may be of any desired shape or size and may be assembled to the hollow member 13 in any desired manner. As here shown, its inner end is exteriorly threaded, slotted, or otherwise formed for cooperation with an internal thread series, slot or other formation at the outer end of the member 13. The main advantage of the internal hollow detachable tip or point 14 shown in Figs. 2, 6 and 9 is that it insures a double concentration of heat at the point of application, viz. the direct heat of the blast flame or heating element which is directly concentrated thereon by virtue of the fact that it is disposed in axial prolongation of the outwardly tapering bore or chamber of the member 13, and the indirect heat which it receives by virtue of the fact that it is overlapped for a substantial portion of its length by the continuously heated outer end of the hollow member in which it is axially inserted.

If it is desired that the inserted tip or point 14 be adjustable to different angular positions with reference to the hollow member 13 and locked in such adjusted position, this may be accomplished by means of a set screw 13ᵃ or its equivalent extending through the wall of the hollow member and engaging the tip or point. By loosening such set screw and rotating the tip or point through a partial revolution, its angular position will be changed, and by tightening the set screw, it may be positively locked in such adjusted position.

This is also true of the form shown in Fig. 8, wherein the hollow member 17 is shown as having a set screw 17ᵃ or its equivalent for positively locking it in any desired position of angular adjustment relative to the burner tube after it has been rotated through a partial revolution to such adjusted position.

Preferably, the outer surface of the tip in the region of the joint 16 merges with the tapered outer surface of the member 13 so as to avoid the possibility of solder penetrating the joint in the use of the device and thereby soldering the tip or point fast to the member 13 and thus prevent intentional detachment of the tip or point when desired.

In the form of my invention shown in Figs. 3, 4, 5, 7, and 8, inclusive, the soldering tip or point is furnished by a hollow member 17 corresponding generally to the member 13 and having quick-detachable engagement with the burner tube 10 as at 21. The outer end of the member 17, however, is closed and such closed end furnishes the actual solder-applying tip or point 18.

In all forms, the hollow members 13 or 17 furnish an internal forwardly tapering bore or chamber 19 which concentrates the blast flame emitted from the burner tube 10 directly upon the soldering tip or point 14 or 18.

In the case of the inserted tips or points 14 shown in Figs. 1, 2 and 6, the bore or chamber 15 of such tip or point constitutes a prolongation of such bore or chamber 19 and compels practically all the heat units to travel to the outer end of the tip or point without appreciable loss or dissipation.

Furthermore, by using the inserted tips or points 14, I eliminate the necessity which existed heretofore of having to remove the entire soldering tip unit in order to attach a differently shaped unit.

In Fig. 9, I have shown the hollow body member such as 13 or 17 heated by an electrical resistance element E which extends longitudinally thereof substantially to its outer end. The element E may be quickly and easily installed within the hollow body member and its design and location is such that the maximum heat is delivered in the minimum time to the outer end of said member. It will be understood that the hollow member shown in Fig. 9 will correspond in shape and structure to either the hollow member 13 of Figs. 1, 2 and 6, or the hollow member 17 of Figs. 3, 4, 5, 7 and 8, as the case may be, and like either of said members will be assembled by any suitable quick-detachable connection, as the screw threads 11 or 21 or the bayonet joint 17' of Fig. 5, to a burner tube similar to the tube 10 shown in Figs. 1 to 6 and Fig. 8. If a hollow member such as 13 is used in the device of Fig. 9, an internal hollow detachable tip or point 14 such as shown in Figs. 2 and 6 is threaded or otherwise fastened in the outer end of said member, and the resistance element E is preferably extended well up into said hollow tip or point. If a hollow member such as 17 is used in the device of Fig. 9, the internal tip or point 14 is omitted, and the resistance element is preferably likewise internally extended towards the extreme outer end or point of application of said member 17.

In all forms, the walls of the members 13 or 17 are of sufficient thickness to permit cutting therein of the screw threads or slots which fasten said members to the burner tube 10 in a quick-detachable manner, as well as to conduct some of the heat from the burner tube to the tip or point 14 or 18.

In all forms except Fig. 9, also, the members 13 or 17 are provided with a sufficient number of holes 20 to support combustion.

From the foregoing description, taken in connection with the accompanying drawing, it will be evident that the heat of the blast flame is concentrated by the hollow members 13 or 17 directly upon the tips or points 14 or 18 so that said tips or points will be instantly heated to the maximum intensity. It will also be evident that this is true regardless of whether the tip or point is a detachable tip 14 inserted in the hollow body member 13, or a hollow body member 17 with integral tip 18, detachably connected to the burner tube as at 21.

Various other modifications in design and method of assembly may obviously be made within the spirit and scope of my invention as defined by the appended claims.

What I therefore claim and desire to secure by Letters Patent is:

1. A soldering iron, comprising a tube along which heat is adapted to be sent, an axially disposed elongated heat conductor mounted upon the outer end of said tube and consisting of a hollow member open at its inner end to provide an attaching portion of enlarged area for engagement with said tube and open at its outer end to receive an inserted tip, said tip receiving portion being of reduced area, the intermediate portion of said member tapering forwardly from said enlarged tube attaching portion to said reduced tip receiving portion, and providing a heat concentrating chamber, and a soldering tip inserted through the open end of said tip receiving portion axially thereof and extending inwardly towards said chamber a substantial distance, said tip being closed at its outer end to provide an applicator point and having an internal bore which extends from said closed end in axial prolongation of said chamber and opens at its inner end into said chamber so that direct heat from said chamber may pass along said bore and be concentrated on said applicator point, the wall of said tip surrounding said bore being overlapped for a substantial distance by the forwardly tapering wall of said heat conductor so that indirect heat from said forwardly tapering wall may be concentrated on said tip wall throughout the distance of wall overlap.

2. The implement of claim 1, the inserted tip being rotatably adjustable in said tip receiving portion, and means for positively locking said tip in any desired position of adjustment.

3. The implement of claim 1, there being an electrical heating element within said bore of the inserted tip.

SAMUEL C. BRODY.